Oct. 30, 1962  G. W. COPE  3,061,114
CONNECTING PIN
Filed April 13, 1960
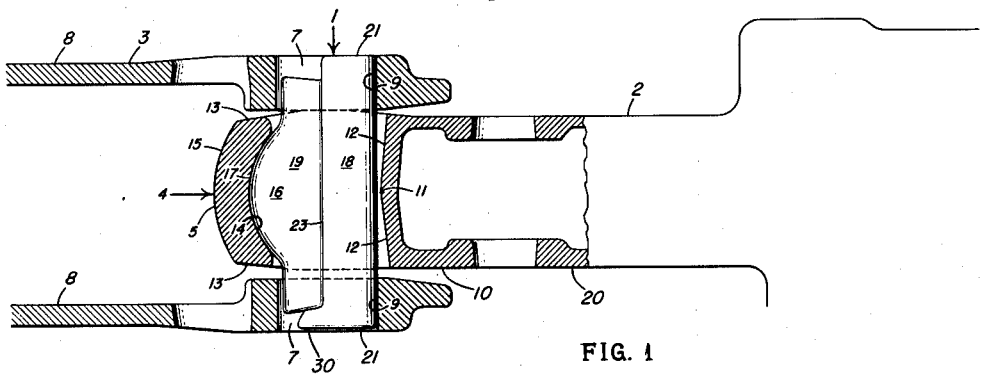
FIG. 1
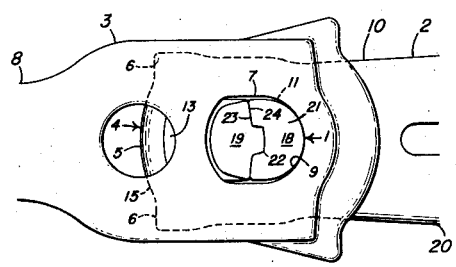
FIG. 2
FIG. 3
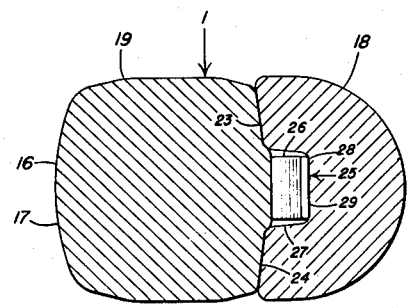
FIG. 4
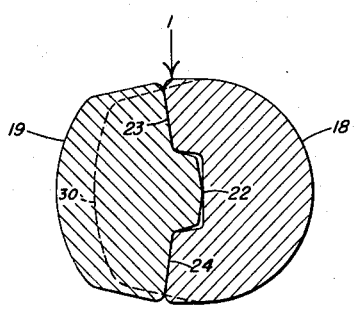
FIG. 5
Inventor:
Geoffrey W. Cope
By Wilmer Mechlin
his Attorney

United States Patent Office 3,061,114
Patented Oct. 30, 1962

3,061,114
CONNECTING PIN
Geoffrey W. Cope, Williamsville, N.Y., assignor to Symington Wayne Corporation, Salisbury, Md., a corporation of Maryland
Filed Apr. 13, 1960, Ser. No. 22,004
7 Claims. (Cl. 213—72)

This invention relates to a connecting pin, sometimes called a coupler or yoke pin, for universally connecting a railway coupler and yoke.

The primary object of the invention is to provide an improvement in an axially split connecting pin such as shown in Blattner reissue application Ser. No. 805,651, filed April 10, 1959, now Patent No. Re. 24,808, reissued April 12, 1960, whereby the parts of the pin are effectively held in position during relative movement of the coupler and yoke.

Another object of the invention is to provide an improved axially split connecting pin whereby, by a spring interlock, the parts of the pin are locked against relative axial movement and, by being urged oppositely against confronting surfaces on the coupler and yoke, are held against vertical displacement relative to the connected members.

An additional object of the invention is to provide an improved axially split connecting pin which, while effectively held against axial displacement, is readily assembled and disassembled.

Other objects and advantages of the invention will appear hereinafter in the detailed description, be particularly pointed out in the appended claims and be illustrated in the accompanying drawings, in which:

FIGURE 1 is a fragmentary side elevational view of a coupler and yoke connected for relative universal angling by a preferred embodiment of the connecting pin of the present invention, portions being broken away and shown in section to more clearly illustrate certain of the details of construction;

FIGURE 2 is a fragmentary plan view of the structure of FIGURE 1;

FIGURE 3 is a vertical sectional view on an enlarged scale of the connecting pin of the preceding figures;

FIGURE 4 is a horizontal sectional view taken along the lines 4—4 of FIGURE 3; and FIGURE 5 is a horizontal sectional view taken along the lines 5—5 of FIGURE 3.

Referring now in detail to the drawings in which like reference characters designate like parts, the improved coupler pin of the present invention, while suited for other uses in which its construction is of advantage, is particularly adapted for use in connecting a coupler and a yoke which are connected for relative universal angling or movement by a single pin. Similar in this respect to the connecting pin of Blattner reissue application Ser. No. 805,651, the connecting pin of this invention, designated as 1, also has been applied for purposes of illustration to the connection of an A.A.R. alternate standard type F coupler 2 to a yoke 3.

Designed to angle or move universally relative to the yoke 3, the illustrated type F coupler typically has on its butt 4 a spherically convex central butt portion 5 and, as in the present standard form, a pair of cylindrically convex wings 6 at the sides of the central portion, which, with the latter, are engageable for limited relative angling with a follower block (not shown) for transmitting buffing and draft forces to a draft gear or other cushioning mechanism (not shown) pocketed in the yoke.

To receive the connecting pin 1, the yoke 3 has a pair of aligned, somewhat elongated pin-receiving openings 7, each extending vertically through one of the yoke arms 8 and having a cylindrically concave front wall 9. The butt portion 10 of the coupler 2, which extends or projects between the yoke arms or straps 8, in its turn has extending through it, forwardly of the butt 4, a vertically directed aperture or opening 11.

Generally cylindrical, the aperture 11 has at the front inclined or sloping stop surfaces 12 diverging forwardly from about the vertical mid-point of the coupler and cooperating with yoke arm-confronting, correspondingly inclined upper and lower walls 13 of the butt portion 10 for limiting by engagement with the pin 1 and yoke arms 8, respectively, the extent of relative vertical angling of the coupler and yoke. Intermediate its vertical extremities the aperture 11 is interrupted by an arcuately concave pocket or socket 14 forming the front face of the rear wall 15 of the coupler and opening forwardly onto the aperture. Struck as a surface of revolution, the pocket 14 preferably is spherically rather than cylindrically concave and its center may coincide with or be slightly forward of the center of the spherical portion 5 of the butt 4 and both centers may be on or slightly above the longitudinal center-line of the coupler.

Conventionally, the connection of a type F coupler to a yoke is made by a cylindrical connecting pin having an associated spring-pressed pillow block fitting into the pocket 14. However, in this invention, as in the Blattner reissue application, the separate pillow block is dispensed with and the connecting pin 1, instead, has, intermediate its ends, an integral, rearwardly projecting protuberance or bulge 16 interfitting or mating with and having a preferably spherically convex rear face 17 coradial and, when in engagement, concentric with the pocket 14. This in turn requires that the pin 1 be axially or longitudinally split into a pair or plurality of front and rear parts 18 and 19, respectively, with the protuberance 16 carried by and integral with the rear part, to enable the pin to be applied and removed.

It is the practice in F coupler installations to support the shank 20 of the coupler 2, forwardly of the yoke by a resilient coupler carrier (not shown) and to support the yoke 3 over the area of connection to the coupler 2 by a support plate (not shown) which ostensibly serves, as well, to hold the connecting pin 1 in place. The difficulty with the support plate as a holding means is that on movement of the coupler 2 and yoke 3 in buff and draft or relative angling of the coupler and yoke, the yoke may be displaced or forced upwardly from its seat on the support plate. The moment this occurs, the connecting pin 1, due to the necessary play or looseness between it and the aperture 11 in the coupler and the openings 7 in the yoke arms 8, is free to drop down relative to the coupler and yoke to the extent of the upward displacement or movement of the yoke relative to the support plate. As a consequence, the protuberance 16 and the pocket 14 are misaligned vertically, causing at minimum excessive wear and, if the yoke does not return to its seat in the interim, jamming of the connection. It is such possible misalignment that the connecting pin 1 of this invention effectively prevents.

As in the Blattner reissue application, the combined upper and lower end portions 21 of the front and rear parts 18 and 19 of the pin 1 are substantially cylindrical to permit relative horizontal angling between the coupler 2 and the yoke 3. Also, the front and rear parts are horizontally aligned or locked against relative transverse movement by an axially extending tongue and groove joint 22 between their confronting or inner faces or interfaces 23 and 24, respectively. However, unlike the connecting pin of the Blattner application, that of this invention additionally has its parts 18 and 19 locked against vertical movement relative to each other and to the coupler. This is accomplished by a spring or resilient lock or locking means 25 interposed between the confronting or inner faces 23 and 24 of the parts 18 and 19 and acting to lock the parts against relative axial movement and at the same time urge them apart or outwardly, radially, so as to maintain the horizontal alignment and contact or engagement between the protuberance 16 and the pocket 14.

In the illustrated embodiment the spring lock 25 is a semi-elliptic or bent or bowed leaf or plate spring, the legs 26 of which are contained, seated or fitted in a recess or relief 27 interrupting the inner face of one of the parts, here, that 24 of the rear part 19 and the bow or intermediate portion 28 of which fits, seats or is received in a substantially arcuately concave recess 29 in the confronting face of the other part, here, the front part 18.

Preferably extending and bent or bowed longitudinally or axially of the connecting pin to facilitate insertion of the front part 18 after the rear part 19 has been placed in position and with the recess 27 of sufficient longitudinal extent to accommodate its flexing without allowing substantial relative axial movement between the parts, the spring 25, in the normal or connecting position of the pin, will lock the parts against relative axial movement. Precompressed or under initial compression, the spring 25, as well, will act horizontally to urge the parts 18 and 19 apart, horizontally or radially, and by so maintaining the protuberance 16 in the pocket 14, prevent the pin from dropping or being displaced from its position, regardless of any vertical or angling movement of the yoke 3 relative to the support plate.

If desired, the front and rear parts 18 and 19 may be coextensive. It is, however, preferred that one of the parts, here, the rear part 19 be shorter than and inset from both extremities of the other, here, front part 18 and that the latter have a foot 30 underlying the bottom end of and supporting the shorter other or rear part 19. This construction ensures that any relative movement during contact between the extremities of the pin and confronting surfaces (not shown) on the car underframe (not shown) will not tend to cause the pin parts to move relative to each other in either an axial or a vertical direction.

From the above detailed description it will be apparent that there has been provided an improved pin for connecting a coupler and yoke which effectively holds itself in position during service movements of the connected members. It should be understood that the described and disclosed embodiment is merely exemplary of the invention and that all modifications are intended to be included which do not depart from the spirit of the invention or the scope of the appended claims.

Having described my invention, I claim:

1. In a coupler and yoke connection, a connecting pin split axially into a plurality of parts, spring means interposed between and acting on said parts for urging said parts apart radially, and means on said parts and engageable by said spring for resisting relative movement therebetween in at least one axial direction.

2. In a coupler and yoke connection, a connecting pin split axially into a plurality of parts, a protuberance on one of said parts fitting into a pocket in said coupler, spring means acting between said parts for urging said protuberance into said pocket, and means on said parts and engageable by said spring for resisting relative movement therebetween in at least one axial direction.

3. In a universal connection between a coupler and a yoke, a connecting pin extending through a vertically directed aperture in a butt portion of said coupler and having its opposite ends rotatively received in arms of said yoke, said pin being split axially into a plurality of parts, one of said parts having an arcuately surfaced protuberance adapted to fit into a correspondingly surfaced pocket in said butt portion and opening onto said aperture, and spring means interposed between said parts for locking said parts against relative axial movement and by urging said protuberance into said pocket holding said pin against vertical movement relative to said butt portion.

4. In a universal connection between a coupler and a yoke, a connecting pin extending through a vertically directed aperture in a butt portion of said coupler and having its opposite ends rotatively received in arms of said yoke, said pin being split axially into a plurality of parts, one of said parts having an arcuately surfaced protuberance adapted to fit into a correspondingly surfaced pocket in said butt portion and opening onto said aperture, and spring means confronting faces of said parts and locking said parts against relative axial movement, said spring means being under compression for urging said parts apart radially and said protuberance into engagement with said pocket.

5. In a universal connection between a coupler and a yoke, a connecting pin extending through a vertically directed aperture in a butt portion of said coupler and having its opposite ends rotatively received in arms of said yoke, said pin being split axially into a plurality of parts, one of said parts having an arcuately surfaced protuberance adapted to fit into a correspondingly surfaced pocket in said butt portion and opening onto said aperture, and spring means interposed between said parts and acting axially thereon to lock said parts against relative axial movement and radially thereon to urge said parts apart and said protuberance into engagement with said pocket.

6. In a universal connection between a coupler and a yoke, a connecting pin extending through a vertically directed aperture in a butt portion of said coupler and having its opposite ends rotatively received in arms of said yoke, said pin being split axially into a plurality of parts, one of said parts having an arcuately surfaced protuberance adapted to fit into a correspondingly surfaced pocket in said butt portion and opening onto said aperture, and spring means interposed between and fitting in seats in confronting faces of said parts, said spring means acting on said parts axially to prevent relative axial movement therebetween and radially to urge said parts apart and said protuberance into engagement with said pocket.

7. In a universal connection between a coupler and a yoke, a connecting pin extending through a vertically directed aperture in a butt portion of said coupler and having its opposite ends rotatively received in arms of said yoke, said pin being split axially into a plurality of parts, one of said parts having an arcuately surfaced protuberance adapted to fit into a correspondingly surfaced pocket in said butt portion and opening onto said aperture and a leaf spring interposed between and bowed axially of said parts and having its legs received in a recess in one of said parts and its intermediate portion seated in a concave seat in the other part, said spring means cooperating with said recess and seat for locking said parts against relative axial movement and being under compression for urging said parts apart and said protuberance into engagement with said pocket.

References Cited in the file of this patent

UNITED STATES PATENTS

| | | |
|---|---|---|
| Re. 24,808 | Blattner | Apr. 12, 1960 |
| 2,593,790 | Pietzch | Apr. 22, 1952 |
| 2,653,505 | Pietzch | Sept. 29, 1953 |
| 2,841,295 | Blattner | July 1, 1958 |
| 2,936,538 | Apsahl | May 17, 1960 |

FOREIGN PATENTS

| | | |
|---|---|---|
| 565,516 | Great Britain | Nov. 14, 1944 |